Dec. 16, 1947.   P. W. MARKWOOD   2,432,916
UNWINDING PACKAGES OF RAYON
Filed June 12, 1946

Inventor
Paul W. Markwood
By Albin F. Knight
Attorney

Patented Dec. 16, 1947

2,432,916

UNITED STATES PATENT OFFICE 2,432,916

UNWINDING PACKAGES OF RAYON

Paul W. Markwood, Enka, N. C., assignor to American Enka Corporation, Enka, N. C., a corporation of Delaware Application June 12, 1946, Serial No. 676,233

10 Claims. (Cl. 242—159)

1

This invention relates to the unwinding of cakes or cheeses of rayon yarn, and is more particularly concerned with the unwinding of a cake of rayon in such a way as to facilitate the removal of the interior tangle and to provide an end for tying to another cake so that satisfactory continuous unwinding may be effected by successive depletion of a plurality of cakes having their ends tied together.

According to conventional practice, the freshly spun cake that is doffed from the spinning pot is first covered with a knitted sock to protect it during subsequent processing. After processing, the cake is placed over an insert that constitutes a central support and unwinding is effected by drawing off succeeding portions of the component yarn thereof beginning at the outside and progressing inwardly. If the unwinding is continuous, the inside yarn end of the first cake to be unwound is tied to the outside end of the next cake to be unwound so that the draw off operation need not be interrupted when a cake is depleted.

It has been found, however, that continuous unwinding according to the foregoing procedure is unsatisfactory due to the fact that the placing of the sock over the cake often produces an internal tangle so that after the sock covered cake is placed over the internal support for unwinding, breakage may occur when the unwinding reaches the zone of the tangle. This problem has long been recognized but no satisfactory solution was heretofore available, since even if the sock is removed before unwinding and the resulting tangle cleared of waste, it is found that another tangle is produced in the placement of the cake over the central support in preparation for unwinding. Thus, the effect of removing the sock before unwinding is to increase the total waste without solving the yarn breakage problem.

If the winding is effected from inside to outside a tangle is produced due to the fact that there is no support for the outer convolutions of the cake.

It is therefore an object of this invention to overcome the foregoing difficulties and to provide for breakage-free continuous unwinding from a plurality of cakes of yarn that are tied together.

According to this invention it is contemplated that the sock be removed from each cake before unwinding, that the interior tangle be cleared and that unwinding be effected from the inside to the outside of the cake while the outer convolutions of the cake are effectively supported against tangling.

Other objects and advantages of this invention

2 will be apparent upon consideration of the following detailed description of one embodiment thereof in conjunction with the annexed drawings wherein:

Figure 1:
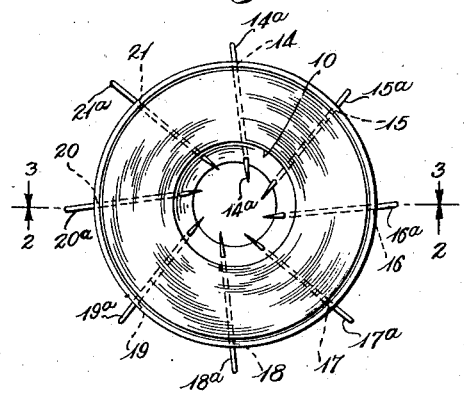
Figure 1 is a top plan view of a cake prepared for unwinding in accordance with the teachings of the present invention.

Referring in greater detail to the drawings, the reference numeral 10 indicates a frusto conical cake or cheese of wound rayon yarn which is supported, with its end of lesser diameter facing downwardly, within a container generally indicated at 11 having frusto conical side walls 12 complementary to the external surface of the cake and having a flat bottom portion 13. The container 11 is provided around its conical surface 12 with a plurality of circumferentially and axially spaced apertures at 14, 15, 16, 17, 18, 19, 20 and 21. These apertures are provided for the reception of needles 14a, 15a, 16a, 17a, 18a, 19a, 20a, and 21a, which needles are thrust through the respective apertures and through the cake body 10 in the manner shown in the figures of the drawings.

Figure 2:
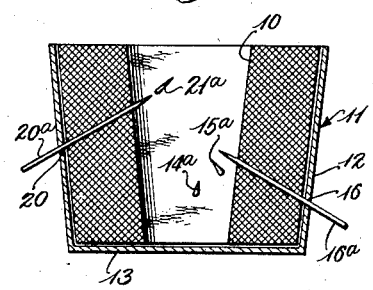
Figure 2 is a vertical sectional view taken along the line 2—2 of Figure 1.
Figure 3:
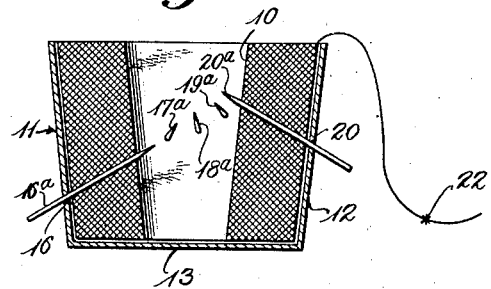
Figure 3 is a vertical sectional view taken along the line 3—3 of Figure 1.

Upon reference to Figure 1 is will be noted that each of the needles is passed through the thread body in a chordwise path, each needle being positioned so that its inner end lies on the same side of a radius taken at the respective aperture as every other needle. The needles are also arranged so that their points extend upwardly in the center of the thread body, as can be seen in Figures 2 and 3. The purpose of arranging all of the needles so that they point upwardly and slope in the same direction away from the center of the pot, is to permit the thread to slip past each needle as it uncoils. Upon reference to Figure 1 it will be noted that the needles are so arranged that the thread may be unwound in a clockwise direction. If the thread were to be unwound in a counterclockwise direction, the position of the needles relative to a radius taken at the respective apertures would have to be changed so that the inner end of each needle lay in trailing spaced relation to a radius taken at the respective aperture.

In operation, the sock is removed from a cake and the latter is placed in a container 11. The interior tangle is removed and the inside end of the thread body is led to a draw off point. The outside end is tied as at 22 to the inside end of the next cake to be unwound, said next cake being prepared for unwinding in the manner just described. The needles positioned as shown in the figures of drawing serve to prevent the cake from collapsing when the last few layers of yarn are being unwound. They also prevent the convolutions of the cake from coiling and falling to form a tangle at any stage during the unwinding operation.

What is claimed is:

1. The method of unwinding hollow spun cakes of rayon yarn that comprises withdrawing successive portions of yarn from the interior of the cake while supporting the yarn body at a plurality of narrow zones that extend from the outer surface of the cake to the interior thereof and slope in the direction of yarn withdrawal.

2. The method of unwinding hollow spun cakes of rayon yarn that comprises withdrawing successive portions of yarn from the interior of the cake while supporting the yarn body at a plurality of narrow zones that extend from the outer surface of the cake to the interior thereof and slope in the direction of yarn withdrawal, said zones being circumferentially spaced.

3. The method of unwinding hollow spun cakes of rayon yarn that comprises withdrawing successive portions of yarn from the interior of the cake while supporting the yarn body at a plurality of narrow zones that extend from the outer surface of the cake to the interior thereof and slope in the direction of yarn withdrawal, said zones being circumferentially and axially spaced.

4. The method of unwinding hollow spun cakes of rayon yarn that comprises supporting the yarn body at a plurality of circumferentially spaced, narrow, chordwise zones that slope upwardly from the outer surface of the cake to its hollow interior while withdrawing the yarn upwardly from said interior of said cake.

5. The method of unwinding hollow spun cakes of rayon yarn that comprises externally supporting the side and one end of said cake and additionally supporting the yarn body at a plurality of narrow chordwise zones that slope toward the unsupported end of said cake from the outer surface of said cake to its hollow interior while withdrawing successive portions of the yarn of said cake from the interior thereof, said zones being axially and circumferentially spaced.

6. The method of unwinding a hollow frusto conical cake of rayon yarn that comprises inverting the cake, externally supporting the conical surface of said cake and the smaller end thereof, and additionally supporting the yarn body at a plurality of narrow, chordwise zones that slope upwardly from the exterior conical surface of the cake to its hollow interior while withdrawing successive portions of the yarn of said cake from the interior thereof, said zones being axially and circumferentially spaced.

7. The method of preparing a hollow spun cake of rayon yarn for unwinding that comprises passing a plurality of narrow, rigid, elongate supports through said cake from the side to the hollow interior, said supports being applied at a plurality of circumferentially spaced points, but all caused to slope in the same direction.

8. The method of preparing a hollow spun cake of rayon yarn for unwinding that comprises surrounding the side and one end of the cake with a support and passing a plurality of narrow, rigid, elongate supports through said cake from the side to the hollow interior, the narrow supports sloping toward the other end of the cake.

9. The method of preparing a hollow spun cake of rayon yarn for unwinding that comprises passing a plurality of narrow, rigid, elongate supports through said cake in a chordwise direction from the side to the hollow interior, said supports being applied at a plurality of axially and circumferentially spaced points and being passed through said cake in a sloping direction.

10. A hollow cake of spun rayon yarn in condition for unwinding from the interior thereof that is characterized by a plurality of pins passing through the wound body from the exterior to the hollow interior, said pins sloping in a common direction relative to a plane normal to the cake axis.

PAUL W. MARKWOOD.